US008432446B2

(12) United States Patent
Son

(10) Patent No.: US 8,432,446 B2
(45) Date of Patent: Apr. 30, 2013

(54) CAMERA ASSEMBLY MOUNTED ON VEHICLE'S NUMBER PLATE

(76) Inventor: Kyong-Sik Son, Seoul (KR)

( * ) Notice: Subject to any disclaimer, the term of this patent is extended or adjusted under 35 U.S.C. 154(b) by 1072 days.

(21) Appl. No.: 12/410,201

(22) Filed: Mar. 24, 2009

(65) Prior Publication Data

US 2010/0245572 A1 Sep. 30, 2010

(51) Int. Cl.
*H04N 7/18* (2006.01)
*G03B 17/00* (2006.01)

(52) U.S. Cl.
USPC .......................................... 348/148; 396/427

(58) Field of Classification Search ................... 396/427; 348/148
See application file for complete search history.

(56) References Cited

U.S. PATENT DOCUMENTS 7,195,405 B2 * 3/2007 Son ............................... 396/427
2009/0128687 A1 * 5/2009 Woo .............................. 348/373

OTHER PUBLICATIONS

Tang-Hsien Chang; Chen-Ju Chou; , "Rear-end collision warning system on account of a rear-end monitoring camera," Intelligent Vehicles Symposium, 2009 IEEE , vol., no., pp. 913-917, Jun. 3-5, 2009.*
Akio Yoneyama, Chia-Hung Yeh, and C.-C. Jay Kuo. 2005. Robust vehicle and traffic information extraction for highway surveillance. EURASIP J. Appl. Signal Process. 2005 (Jan. 2005).*

\* cited by examiner

*Primary Examiner* — Lynn Feild
*Assistant Examiner* — Taylor Elfervig
(74) *Attorney, Agent, or Firm* — John K. Park; Park Law Firm

(57) ABSTRACT

A monitoring camera assembly includes a camera portion, a rear housing, and two front housing. The camera portion for sensing image of a object behind a vehicle including a camera body, a camera lens, and two rotational axles. The rear housing is installed on the license plate and support the camera body, including a pair of axle supports and a pair of fixing extensions. The pair of front housings engages one of the two rotational axles of the camera portion and one of the pair of axle supports rotatably, and includes a supporting groove for keeping the rotational axle in place and a first mechanical fastening device for fastening the front housing to the license plate.

18 Claims, 7 Drawing Sheets

-- Prior Art --

CAMERA ASSEMBLY MOUNTED ON VEHICLE'S NUMBER PLATE

BACKGROUND OF THE INVENTION

The present invention is related to a monitoring camera assembly. More particularly, the invention is related to a monitoring camera assembly, which prevents a camera portion from being taken away externally.

A monitoring camera is usually installed on a vehicle's number plate or license plate to monitor the rear side of the vehicle for safety.

A type of camera assembly of prior arts looks like one shown in FIG. 1. The camera 5 is assembled into a space 4 between a pair of supports 3 protruding from a portion of the rectangular frame 2. The camera 5 includes a cylindrical body 5a, a lens 5b disposed at a central portion of the cylindrical body 5a. The pair of supports 3 includes bolts 3a.

These types of camera assembly have several problems due to their structure. First, even though a user does not want such a rectangular frame, there is no choice for the user wanting the rear monitoring camera. Secondly, the camera 5 can be easily taken out by unscrewing the bolts 3a.

SUMMARY OF THE INVENTION

The present invention contrives to solve the disadvantages of the prior art.

An objective of the invention is to provide a monitoring camera assembly that can be flexible in selecting the portion for installing monitoring camera.

Another objective of the invention is to provide a monitoring camera assembly that prevents the camera portion from being stolen.

An aspect of the invention provides a monitoring camera assembly comprising a camera portion, a rear housing, and two front housing.

The camera portion for sensing image of a object behind a vehicle comprising: a camera body configured to be disposed horizontally over a license plate and to rotate about an central axis through the camera body; a camera lens disposed at a side of the camera body; and two rotational axles, each of which extending from one of both ends of the camera body and aligning with the central axis.

The rear housing is configured to be installed on the license plate and support the camera body, the rear housing comprising: a pair of axle supports for supporting the two rotational axles rotatably; and a pair of fixing extensions extending from both ends.

The pair of front housings, each of which being configured to fixed to one of the pair of fixing extensions of the rear housing, engages one of the two rotational axles of the camera portion and one of the pair of axle supports rotatably, and comprises: a supporting groove for keeping the rotational axle in place; and a first mechanical fastening device for fastening the front housing to the license plate.

The camera body may be substantially cylindrical. The camera lens may protrude from the side of the camera body substantially perpendicularly to an axis through the cylindrical camera body.

The two rotational axles may be substantially cylindrical. The two rotational axles may share the axis through the cylindrical camera body.

The camera portion may further comprise a cable for transmitting an image data from the camera portion to an optical device including a display in the vehicle and a navigation terminal.

Each of the pair of axle supports may have a cylindrical groove corresponding to an outer side surface of the rotational axle for supporting one of the two rotational axles rotatably.

The pair of fixing extensions of the rear housing may be fully covered by one of the pair of front housings.

The supporting groove of the front housing may be rotatably engaged with one of the two rotational axles. An external surface of the front housing may be aligned with the outer surface of the camera body.

The first mechanical fastening device may be provided below the front housings.

The rear housing may further comprise a cradle portion disposed between the pair of axle supports. The cradle portion may comprise a cylindrical groove corresponding to an outer side surface of the camera body rotatably.

The monitoring camera assembly may further comprise an outlining frame, which forms a frame around the license plate jointly with the front housings installed on a top portion of the license plate. The outlining frame may engage with the front housing with a smooth surface.

The monitoring camera assembly may further comprise one or more second mechanical fastening devices disposed above a bottom portion of the outlining frame. The one or more second mechanical fastening devices may be configured to fasten the outlining frame and the license plate to the vehicle. Each of the first mechanical fastening device and the second mechanical fastening devices may comprise a bolt and a hole for the bolt.

The advantages of the present invention are: (1) the camera assembly can be installed with selections of parts; and (2) the camera portion is hard to take away from outside.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
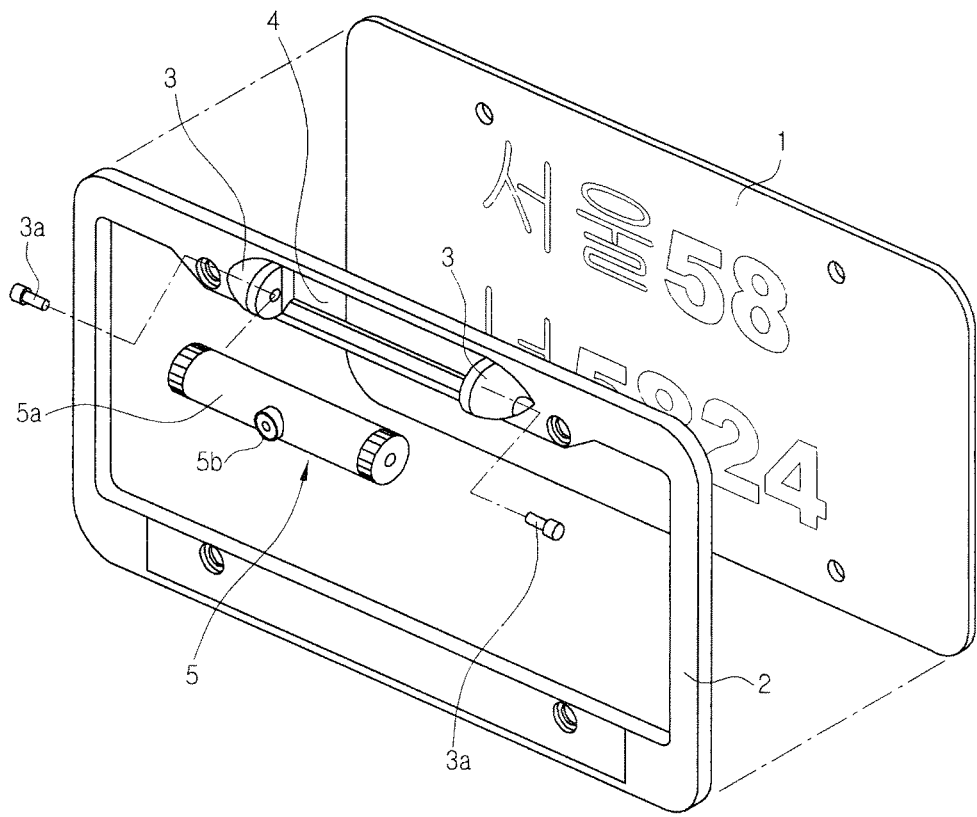
FIG. 1 is an exploded perspective view showing a monitoring camera by prior art.
Figure 2:
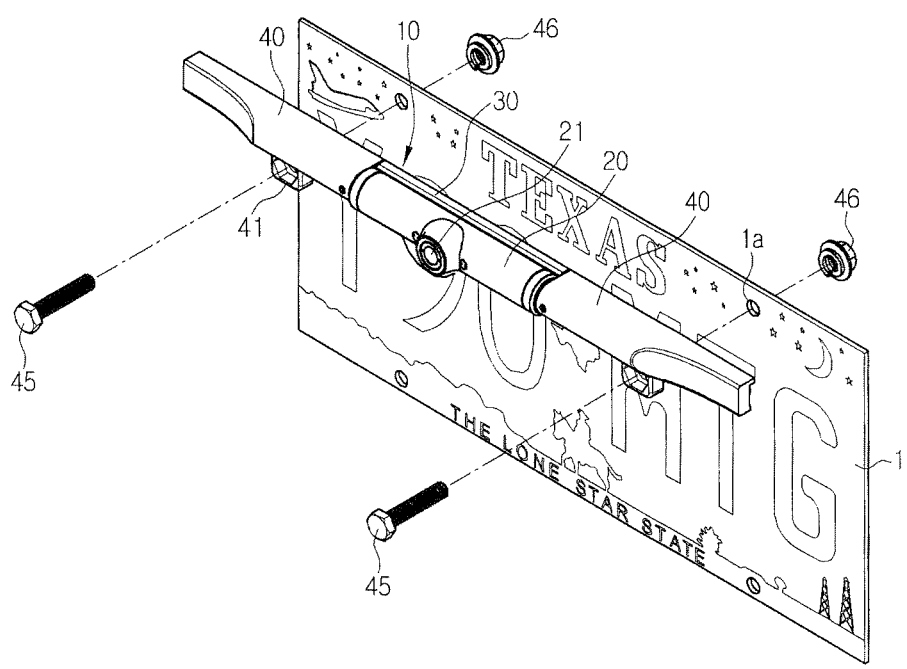
FIG. 2 is an exploded perspective view showing a monitoring camera assembly according to an embodiment of the present invention.

FIGS. 2~7 show that a monitoring camera assembly 10 of the present invention.

An aspect of the invention provides the monitoring camera assembly 10 comprising a camera portion 20, a rear housing 30, and two front housings 40.

The camera portion 20 for sensing image of a object behind a vehicle comprising: a camera body 20 configured to be disposed horizontally over a license plate 1 and to rotate about an central axis through the camera body 20; a camera lens 21 disposed at a side of the camera body 20; and two rotational axles 22, each of which extending from one of both ends of the camera body 20 and aligning with the central axis.

The rear housing 30 is configured to be installed on the license plate 1 and support the camera body 20, the rear housing 30 comprising: a pair of axle supports 31 for supporting the two rotational axles 22 rotatably; and a pair of fixing extensions 32 extending from both ends.

The pair of front housings 40, each of which being configured to fixed to one of the pair of fixing extensions 32 of the rear housing 30, engages one of the two rotational axles 22 of the camera portion 20 and one of the pair of axle supports 31 rotatably, and comprises: a supporting groove 42 for keeping the rotational axle 22 in place; and a first mechanical fastening device 41 for fastening the front housing 40 to the license plate 1.

The camera body 20 may be substantially cylindrical. The camera lens 21 may protrude from the side of the camera body 20 substantially perpendicularly to an axis through the cylindrical camera body 20.

The two rotational axles 22 may be substantially cylindrical. The two rotational axles 22 may share the axis through the cylindrical camera body 20.

The camera portion 20 may further comprise a cable 23 for transmitting an image data from the camera portion 20 to an optical device (not shown) including a display in the vehicle and a navigation terminal.

Figure 3:
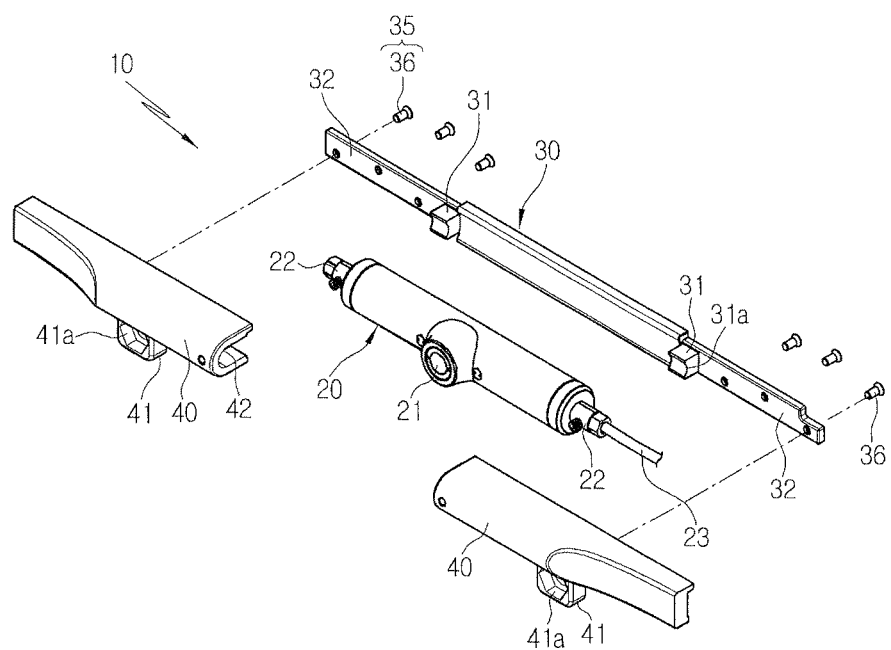
FIG. 3 is another exploded perspective view of the monitoring camera assembly.
Figure 4:
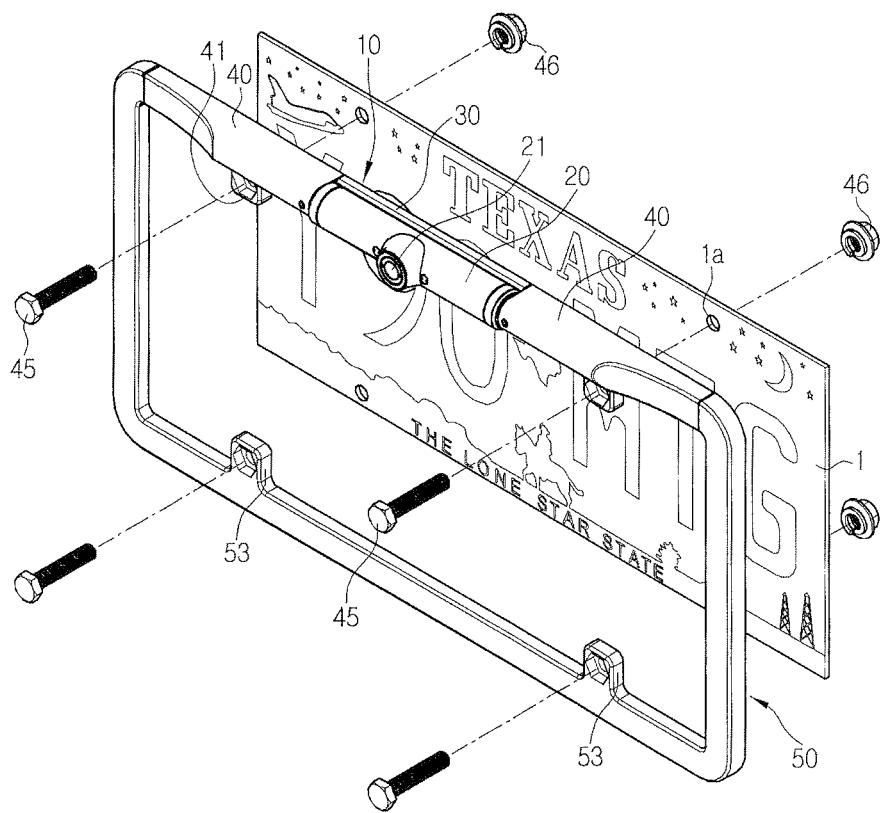
FIG. 4 is another exploded perspective view of the monitoring camera assembly with outlining frame according to another embodiment of the present invention.
Figure 5:
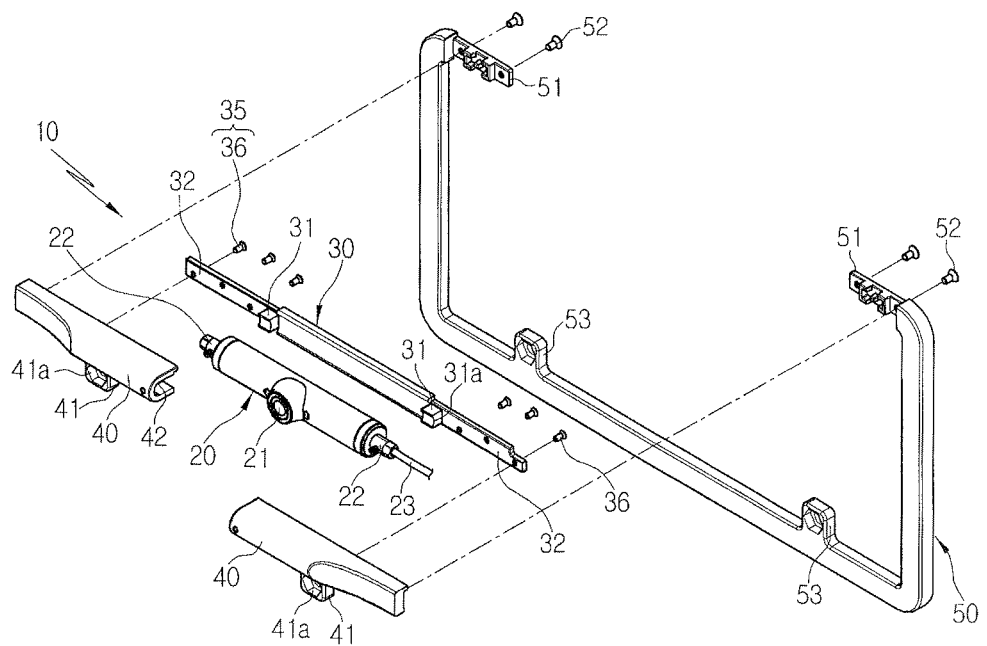
FIG. 5 is another exploded perspective view of the monitoring camera assembly of FIG. 4.
Figure 6:
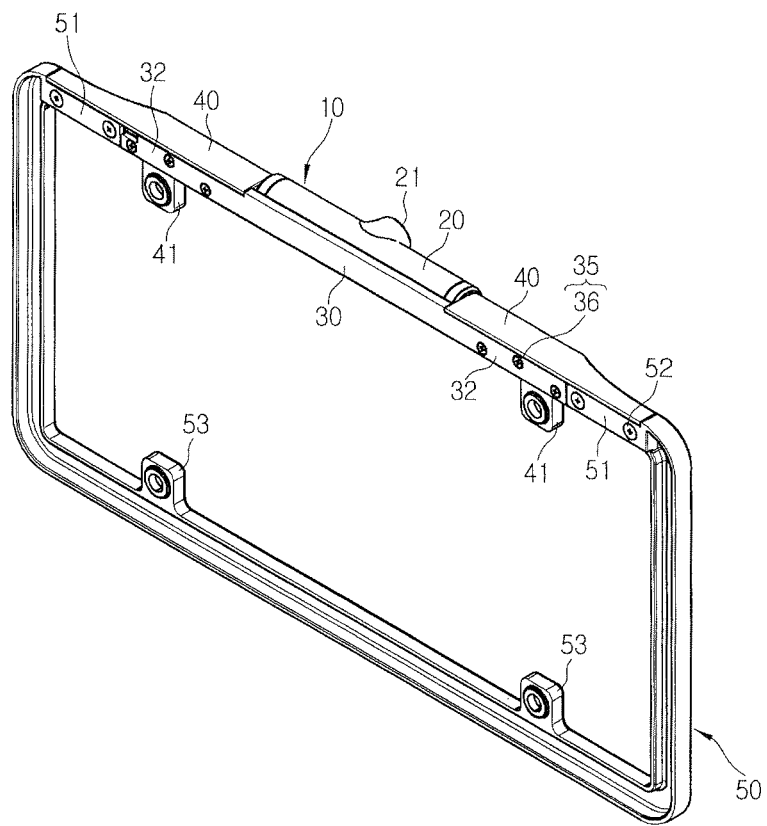
FIG. 6 is a perspective rear view of the monitoring camera assembly.
Figure 7:
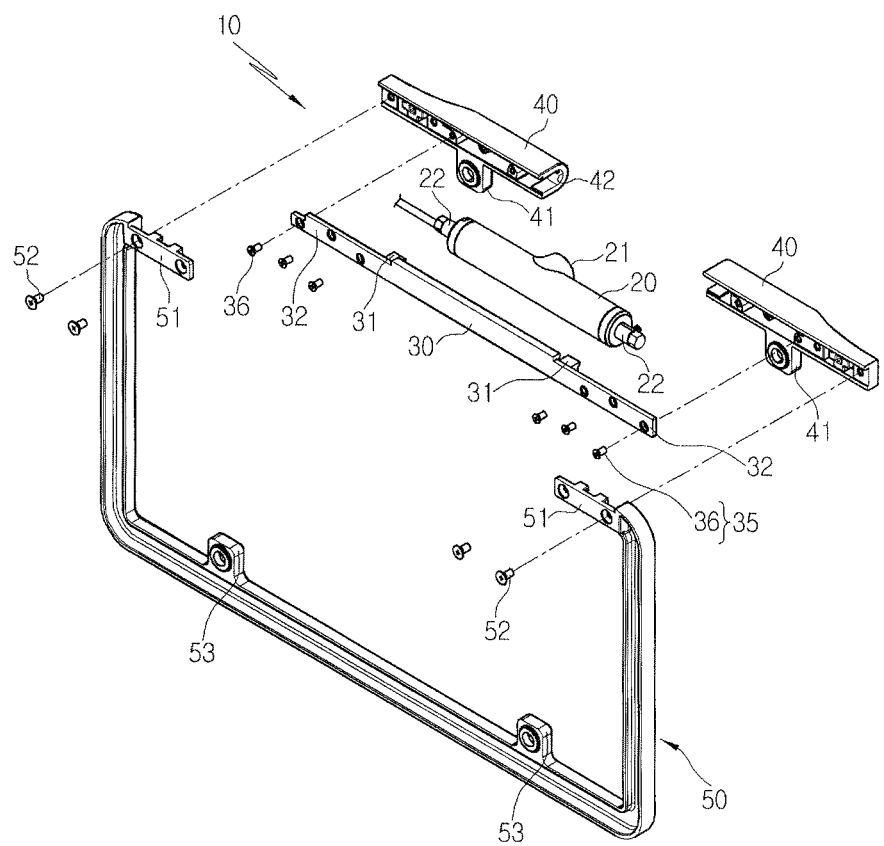
FIG. 7 is an exploded perspective rear view of the monitoring camera assembly.

Each of the pair of axle supports 31 may have a cylindrical groove corresponding to an outer side surface of the rotational axle 22 for supporting one of the two rotational axles 22 rotatably as shown in FIG. 3.

The pair of fixing extensions 32 of the rear housing 30 may be fully covered by one of the pair of front housings 40.

The supporting groove 42 of the front housing 40 may be rotatably engaged with one of the two rotational axles 22. An external surface of the front housing 40 may be aligned with the outer surface of the camera body 20.

The first mechanical fastening device 41 may be provided below the front housings 40.

The rear housing 30 may further comprise a cradle portion disposed between the pair of axle supports 31. The cradle portion may comprise a cylindrical groove corresponding to an outer side surface of the camera body 20 rotatably as shown in FIG. 3.

The monitoring camera assembly 10 may further comprise an outlining frame 50, which forms a frame around the license plate 1 jointly with the front housings 40 installed on a top portion of the license plate 1. The outlining frame 50 may engage with the front housing 40 with a smooth surface.

The monitoring camera assembly 10 may further comprise one or more second mechanical fastening devices 51 disposed above a bottom portion of the outlining frame 50. The one or more second mechanical fastening devices 51 may be configured to fasten the outlining frame 50 and the license plate 1 to the vehicle. Each of the first mechanical fastening device 41 and the second mechanical fastening devices 51 may comprise a bolt 45 and a hole 41a, 53 for the bolt 45.

While the invention has been shown and described with reference to different embodiments thereof, it will be appreciated by those skilled in the art that variations in form, detail, compositions and operation may be made without departing from the spirit and scope of the invention as defined by the accompanying claims. For example, the rotating guide surface 211 may be formed convex and the rotation surface 111 may be formed concave.

What is claimed is:

1. A monitoring camera assembly comprising:
    a camera portion that senses image of a object behind a vehicle, the camera portion comprising:
        a camera body configured to be disposed horizontally over a license plate and to rotate about an central axis through the camera body;
        a camera lens disposed at a side of the camera body; and
        two rotational axles, each of which extending from one of both ends of the camera body and aligning with the central axis;
    a rear housing configured to be installed on the license plate and support the camera body, the rear housing comprising:
        a pair of axle supports for supporting the two rotational axles rotatably; and
        a pair of fixing extensions extending from both ends for fixing the pair of axle supports to the license plate; and
    a pair of front housings, each of which being configured to fixed to one of the pair of fixing extensions of the rear housing, engaging one of the two rotational axles of the camera portion and one of the pair of axle supports rotatably, and comprising:
        a supporting groove for keeping the rotational axle in place along with a corresponding one of the pair of axle supports of the rear housing; and
        a first mechanical fastening device for fastening the front housing to the license plate from a front thereof.

2. The monitoring camera assembly of claim 1, wherein the camera body is substantially cylindrical.

3. The monitoring camera assembly of claim 2, wherein the camera lens protrudes from the side of the camera body substantially perpendicularly to an axis through the cylindrical camera body.

4. The monitoring camera assembly of claim 1, wherein the two rotational axles are substantially cylindrical.

5. The monitoring camera assembly of claim 4, wherein the two rotational axles share the axis through the cylindrical camera body.

6. The monitoring camera assembly of claim 1, wherein the camera portion further comprises a cable for transmitting an image data from the camera portion to an optical device including a display in the vehicle and a navigation terminal.

7. The monitoring camera assembly of claim 1, wherein each of the pair of axle supports has a cylindrical groove corresponding to an outer side surface of the rotational axle for supporting one of the two rotational axles rotatably.

8. The monitoring camera assembly of claim 1, wherein the pair of fixing extensions of the rear housing is fully covered by one of the pair of front housings.

9. The monitoring camera assembly of claim 1, wherein the supporting groove of the front housing is rotatably engaged with one of the two rotational axles.

10. The monitoring camera assembly of claim 9, wherein an external surface of the front housing is aligned with the outer surface of the camera body.

11. The monitoring camera assembly of claim 1, wherein the first mechanical fastening device is provided below the front housings.

12. The monitoring camera assembly of claim 1, wherein the rear housing further comprises a cradle portion disposed between the pair of axle supports.

13. The monitoring camera assembly of claim 12, wherein the cradle portion comprises a cylindrical groove corresponding to an outer side surface of the camera body rotatably.

14. The monitoring camera assembly of claim 1, further comprising an outlining frame, which forms a frame around the license plate jointly with the front housings installed on a top portion of the license plate.

15. The monitoring camera assembly of claim 14, wherein the outlining frame engages with the front housing with a smooth surface.

16. The monitoring camera assembly of claim 14, further comprising one or more second mechanical fastening devices disposed above a bottom portion of the outlining frame.

17. The monitoring camera assembly of claim 16, wherein the one or more second mechanical fastening devices are configured to fasten the outlining frame and the license plate to the vehicle.

18. The monitoring camera assembly of claim 17, wherein each of the first mechanical fastening device and the second mechanical fastening devices comprises a bolt and a hole for the bolt.

\* \* \* \* \*